United States Patent
Kline et al.

(10) Patent No.: US 10,755,708 B2
(45) Date of Patent: Aug. 25, 2020

(54) OPERATING A VOICE RESPONSE SYSTEM BASED ON NON-HUMAN AUDIO SOURCES

(71) Applicant: INTERNATIONAL BUSINESS MACHINES CORPORATION, Armonk, NY (US)

(72) Inventors: Eric V. Kline, Rochester, MN (US); Sarbajit K. Rakshit, Kolkata (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 146 days.

(21) Appl. No.: 16/012,796

(22) Filed: Jun. 20, 2018

(65) Prior Publication Data

US 2019/0392856 A1    Dec. 26, 2019

(51) Int. Cl.
*G10L 15/22*    (2006.01)
*G10L 25/51*    (2013.01)
*G10L 25/72*    (2013.01)
*G08B 3/10*    (2006.01)

(52) U.S. Cl.
CPC ............... *G10L 15/22* (2013.01); *G08B 3/10* (2013.01); *G10L 25/51* (2013.01); *G10L 25/72* (2013.01)

(58) Field of Classification Search
CPC ..................................................... G10L 15/22
See application file for complete search history.

(56) References Cited

U.S. PATENT DOCUMENTS

| | | | |
|---|---|---|---|
| 6,782,847 B1 | 8/2004 | Shemesh et al. | |
| 8,214,211 B2 | 7/2012 | Yoshioka | |
| 9,041,545 B2 | 5/2015 | Zelepugas | |
| 9,306,689 B2 | 4/2016 | Weiss et al. | |
| 9,484,030 B1* | 11/2016 | Meaney | G10L 15/22 |
| 9,609,424 B2 | 3/2017 | Goldstein | |
| 10,074,374 B2* | 9/2018 | Brands | H04L 9/3234 |
| 2011/0053558 A1* | 3/2011 | Teague | H04L 9/3273 |
| | | | 455/411 |
| 2011/0063429 A1* | 3/2011 | Contolini | A61B 17/00 |
| | | | 348/77 |

(Continued)

OTHER PUBLICATIONS

Belin, Pascal "Voice Processing in human and non-human primates", Philos Trans R Soc Land B Biol Sci. Dec. 29, 2006; 361 (1476): 2091-2107; published online Nov. 3, 2006; https://www.ncbi.nlm.nih.gov/pmc/articles/PMC1764839/; 26 pgs.

(Continued)

*Primary Examiner* — Douglas Godbold
(74) *Attorney, Agent, or Firm* — Cantor Colburn LLP; Tihon Poltavets (57) ABSTRACT

Methods, systems and computer program products for operating a voice response system based on non-human audio sources are provided. Aspects include receiving, by a voice response system, an audio signal from non-human source and analyzing the audio signal to identify a source of the audio signal. Based on a determination that the source of the audio signal is controllable by the voice response system, aspects include instructing, by the voice response system, the source of the audio signal to take an action based on the audio signal. Based on a determination that the source of the audio signal is not controllable by the voice response system, aspects include providing an alert, by the voice response system that indicates the source of the audio signal.

14 Claims, 6 Drawing Sheets

(56) References Cited

U.S. PATENT DOCUMENTS

| | | | | |
|---|---|---|---|---|
| 2013/0007201 | A1* | 1/2013 | Jeffrey | G10H 1/0008 |
| | | | | 709/217 |
| 2013/0242706 | A1* | 9/2013 | Newsome, Jr. | H04L 9/0844 |
| | | | | 367/197 |
| 2014/0153747 | A1* | 6/2014 | Contolini | G06F 19/34 |
| | | | | 381/122 |
| 2016/0379456 | A1* | 12/2016 | Nongpiur | G08B 13/1672 |
| | | | | 340/541 |
| 2017/0287500 | A1* | 10/2017 | De Mers | G10L 15/08 |
| 2018/0308490 | A1* | 10/2018 | Lim | G10L 15/18 |
| 2019/0122526 | A1* | 4/2019 | Agnihotri | G08B 21/24 |
| 2019/0227967 | A1* | 7/2019 | Kim | G06F 13/36 |
| 2019/0281254 | A1* | 9/2019 | Baldwin | H04N 7/15 |

OTHER PUBLICATIONS

Disclosed Anonymously "Method and apparatus of risk alarming based on cognitive computing", An IP.com Prior Art Database Technical Disclosure; IP.com No. IPCOM000252969D; Publication Date: Feb. 25, 2018; 5 pgs.

Liao, Wen-Hung et al., Abstract "Classification of non-speech human sounds: Feature selection and snoring sound analysis", published in: Systems, Man and Cybernetics, 2009; SMC 2009; IEEE International Conference; retrieved from Internet: https://ieeexplore.ieee.org/document/5346556/; 2 pgs.

Pierce, David "How Apple Finally Made SIRI Sound More Human", GEAR; Sep. 7, 2017; retrieved from Internet Jun. 4, 2018; https://www.wired.com/story/how-apple-finally-made-siri-sound-more-human/; 19 pgs.

\* cited by examiner

OPERATING A VOICE RESPONSE SYSTEM BASED ON NON-HUMAN AUDIO SOURCES

BACKGROUND

The invention relates generally to operating a voice response system and, more specifically, to operating a voice response system based on non-human audio sources.

Voice response systems are becoming ubiquitous and are currently used to control a wide variety of devices, such as televisions, personal assistants, home network devices, thermostats, entertainment systems, and the like. Voice response systems monitor the audio for a voice command and analyze received voice commands by analyzing the contextual meaning of the command and responsively perform requested actions. Currently available voice response systems are only configured to analyze human voices and take appropriate action but do not analyze different types of non-human sounds, like sound of wind, broken glass items, screaming of animals/birds, or sound being created by any machine in the surrounding, like a vacuum, a blender, an air conditioning compressor, or the like.

SUMMARY

According to an embodiment, a system for operating a voice response system based on non-human audio sources is provided. The system includes a memory having computer readable computer instructions, and a processor for executing the computer readable instructions. The computer readable instructions include instructions for receiving a voice command from a first user and determining an identity of the first user based at least in part on a voice recognition of the first user. The computer readable instructions also include instructions for receiving, by a voice response system, an audio signal from non-human source and analyzing the audio signal to identify a source of the audio signal. Based on a determination that the source of the audio signal is controllable by the voice response system, the computer readable instructions also include instructions for instructing, by the voice response system, the source of the audio signal to take an action based on the audio signal. Based on a determination that the source of the audio signal is not controllable by the voice response system, the computer readable instructions also include instructions for providing an alert, by the voice response system that indicates the source of the audio signal.

According to another embodiment, a method for operating a voice response system based on non-human audio sources is provided. The method includes receiving, by a voice response system, an audio signal from non-human source and analyzing the audio signal to identify a source of the audio signal. Based on a determination that the source of the audio signal is controllable by the voice response system, the method includes instructing, by the voice response system, the source of the audio signal to take an action based on the audio signal. Based on a determination that the source of the audio signal is not controllable by the voice response system, the method includes providing an alert, by the voice response system that indicates the source of the audio signal.

According to a further embodiment, a computer program product is provided. The computer program product includes a computer readable storage medium having program instructions embodied therewith. The computer readable storage medium is not a transitory signal per se. The program instructions are executable by a computer processor to cause the computer processor to perform a method. The method includes receiving, by a voice response system, an audio signal from non-human source and analyzing the audio signal to identify a source of the audio signal. Based on a determination that the source of the audio signal is controllable by the voice response system, the method includes instructing, by the voice response system, the source of the audio signal to take an action based on the audio signal. Based on a determination that the source of the audio signal is not controllable by the voice response system, the method includes providing an alert, by the voice response system that indicates the source of the audio signal.

Additional features and advantages are realized through the techniques of the invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings, in which:

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems; storage, deployed applications, and possibly limited control of select networking components (e.g., host firewalls).

Deployment Models are as follows:

Private cloud: the cloud infrastructure is operated solely for an organization. It may be managed by the organization or a third party and may exist, on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist, on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 1:
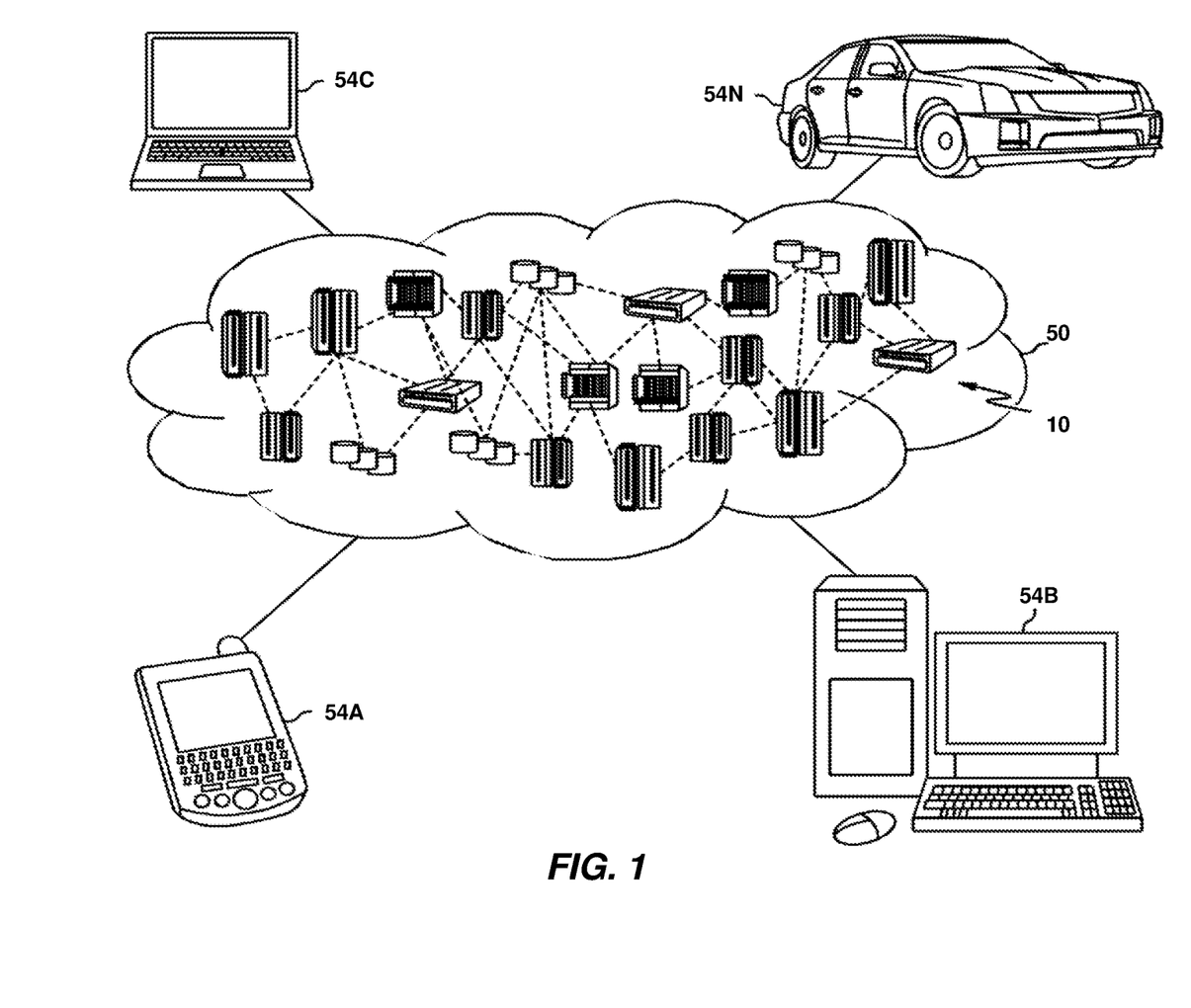
FIG. 1 depicts a cloud computing environment according to one or more embodiments of the present invention.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
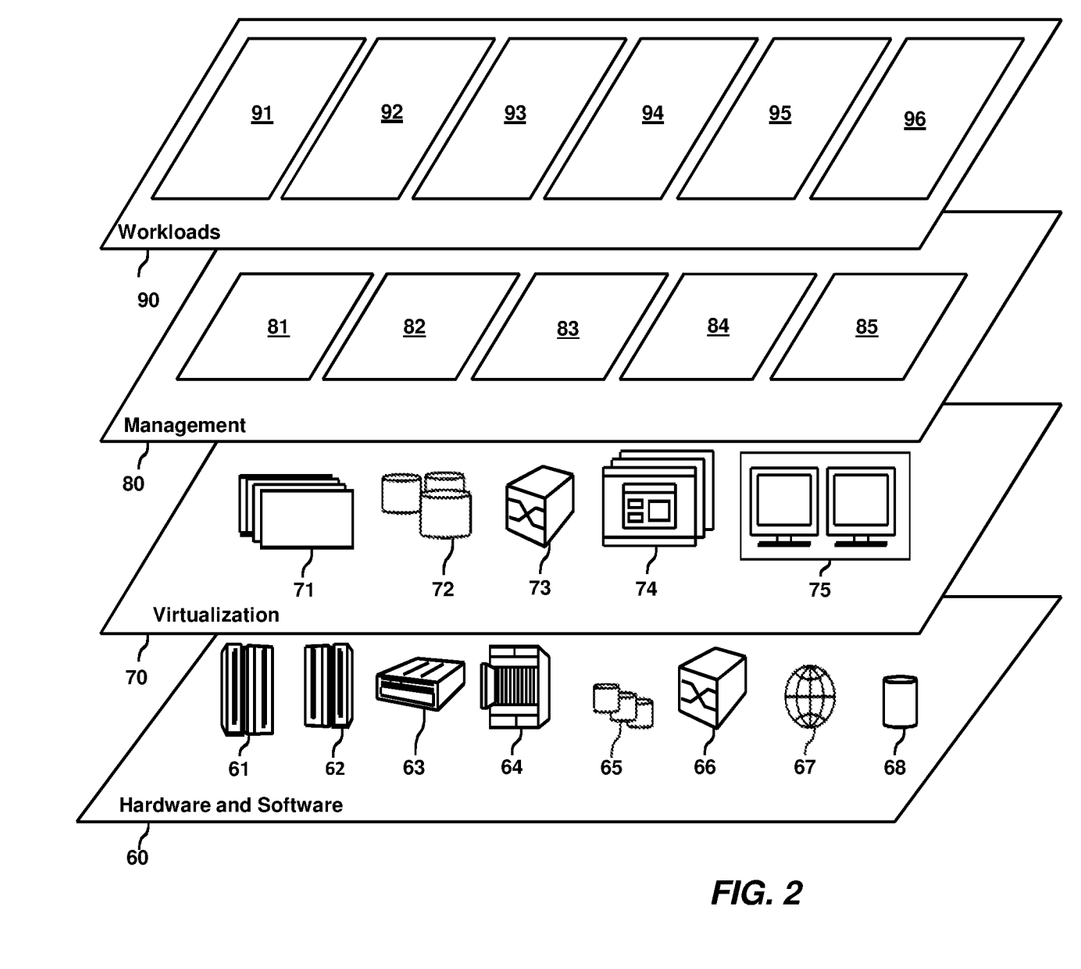
FIG. 2 depicts abstraction model layers according to one or more embodiments of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and operating a voice response system based on non-human audio sources 96.

Figure 3:
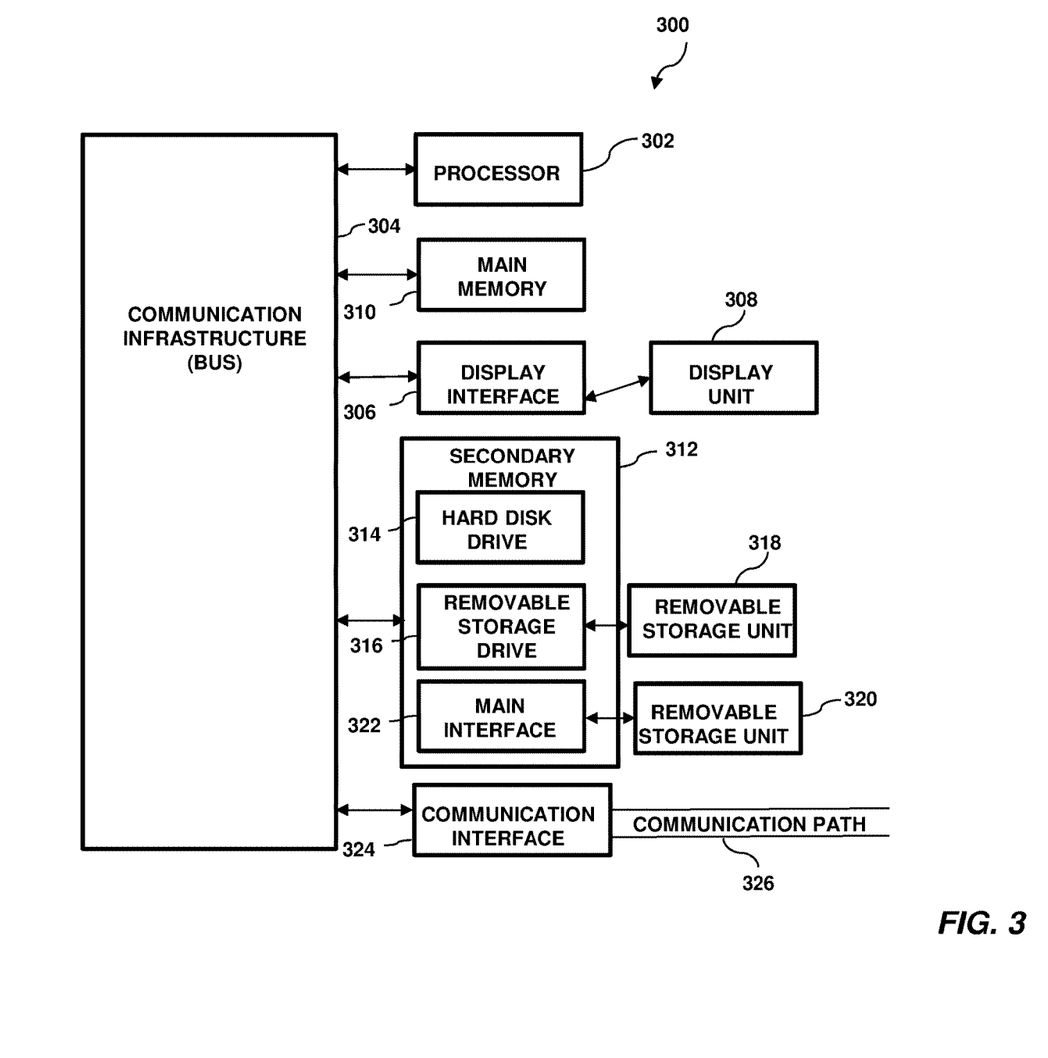
FIG. 3 depicts an exemplary computer system capable of implementing one or more embodiments of the present invention.

Turning now to a more detailed description of aspects of the present invention, FIG. 3 illustrates a high-level block diagram showing an example of a computer-based system 300 useful for implementing one or more embodiments of the invention. Although one exemplary computer system 300 is shown, computer system 300 includes a communication path 326, which connects computer system 300 to additional systems and may include one or more wide area networks (WANs) and/or local area networks (LANs) such as the internet, intranet(s), and/or wireless communication network(s). Computer system 300 and additional systems are in communication via communication path 326, (e.g., to communicate data between them).

Computer system 300 includes one or more processors, such as processor 302. Processor 302 is connected to a communication infrastructure 304 (e.g., a communications bus, cross-over bar, or network). Computer system 300 can include a display interface 306 that forwards graphics, text, and other data from communication infrastructure 304 (or from a frame buffer not shown) for display on a display unit 308. Computer system 300 also includes a main memory 310, preferably random access memory (RAM), and may also include a secondary memory 312. Secondary memory 312 may include, for example, a hard disk drive 314 and/or a removable storage drive 316, representing, for example, a floppy disk drive, a magnetic tape drive, or an optical disk drive. Removable storage drive 316 reads from and/or writes to a removable storage unit 318 in a manner well known to those having ordinary skill in the art. Removable storage unit 318 represents, for example, a floppy disk, a compact disc, a magnetic tape, or an optical disk, etc. which is read by and written to by a removable storage drive 316. As will be appreciated, removable storage unit 318 includes a computer readable medium having stored therein computer software and/or data.

In some alternative embodiments of the invention, secondary memory 312 may include other similar means for allowing computer programs or other instructions to be loaded into the computer system. Such means may include, for example, a removable storage unit 320 and an interface 322. Examples of such means may include a program package and package interface (such as that found in video game devices), a removable memory chip (such as an EPROM or PROM) and associated socket, and other removable storage units 320 and interfaces 322 which allow software and data to be transferred from the removable storage unit 320 to computer system 300.

Computer system 300 may also include a communications interface 324. Communications interface 324 allows software and data to be transferred between the computer system and external devices. Examples of communications interface 324 may include a modem, a network interface (such as an Ethernet card), a communications port, or a PCM-CIA slot and card, etc. Software and data transferred via communications interface 324 are in the form of signals which may be, for example, electronic, electromagnetic, optical, or other signals capable of being received by communications interface 324. These signals are provided to communications interface 324 via communication path (i.e., channel) 326. Communication path 326 carries signals and may be implemented using wire or cable, fiber optics, a phone line, a cellular phone link, an RF link, and/or other communications channels.

In the present disclosure, the terms "computer program medium," "computer usable medium," and "computer readable medium" are used to generally refer to media such as main memory 310 and secondary memory 312, removable storage drive 316, and a hard disk installed in hard disk drive 314. Computer programs (also called computer control logic) are stored in main memory 310, and/or secondary memory 312. Computer programs may also be received via communications interface 324. Such computer programs, when run, enable the computer system to perform the features of the present disclosure as discussed herein. In particular, the computer programs, when run, enable processor 302 to perform the features of the computer system. Accordingly, such computer programs represent controllers of the computer system.

In exemplary embodiments, a system for operating a voice response system based on non-human audio sources is provided. In exemplary embodiments, a voice response system is configured to receive and analyze audio signals from non-human sources in addition to human audio sources. In exemplary embodiments, the voice response system is configured to analyze audio signals from non-human sources and to identify the source of the audio signal. Based on the audio signal, the identified source and user preferences the voice response system can take a variety of actions. The actions can include providing an alert to a user or another party that indicates the source of the audio signal and an action that needs to be taken. In addition, the actions can include instructing the source of the audio signal to perform an action, if the source is a connected device that is controllable by the voice response system.

Figure 4:
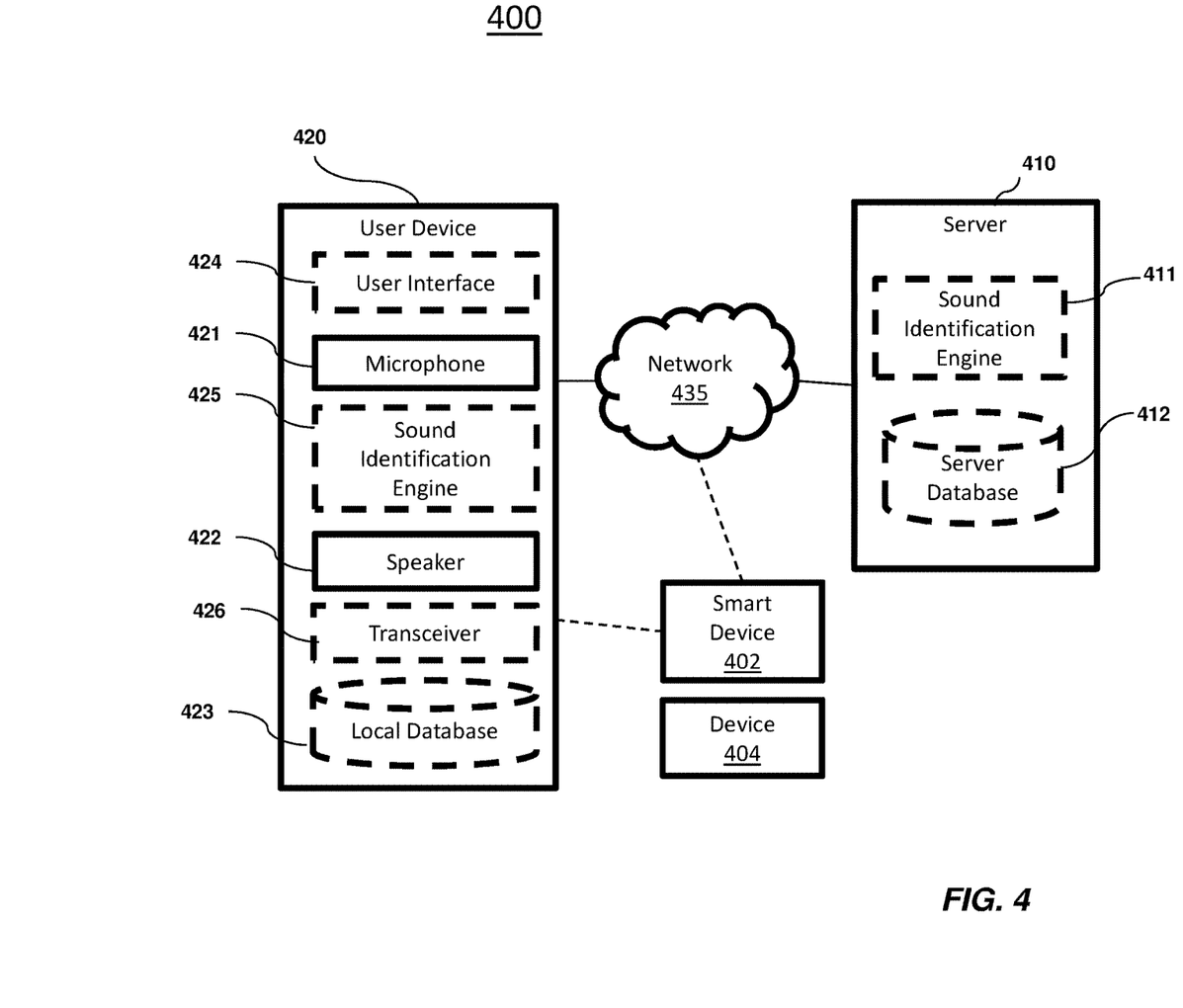
FIG. 4 depicts a system upon which operating a voice response system based on non-human audio sources may be implemented according to one or more embodiments of the present invention.

Turning now to FIG. 4, a system 400 upon which operating a voice response system based on non-human audio sources may be implemented will now be described in accordance with an embodiment. The system 400 shown in FIG. 4 includes a server 410 in communication with a user device 420 via a communications network 435. The communications network 435 may be one or more of, or a combination of, public (e.g., Internet), private (e.g., local area network, wide area network, virtual private network), and may include wireless and wireline transmission systems (e.g., satellite, cellular network, terrestrial networks, etc.). In exemplary embodiments, the user device 420 is configured to receive audio signals from smart devices 402, which are devices that are capable of being controlled by the user device 420, and devices 404 in range of the user device 420.

In exemplary embodiments, the user device 420 can be a smartphone, a tablet, a computer system such as the one shown in FIG. 3, a smart speaker, a television, or any other suitable electronic device. The user device 420 includes a microphone 421 and a speaker 422. Optionally, the user device 420 can also include a local database 423, a user interface 424, a sound identification engine 425, and a transceiver 426. The microphone 421 is used to detect audio signals created by the smart device 402 and/or the device 404. In exemplary embodiments, the local database 423 is configured to store audio samples of sounds previously captured by the user device 420 from the smart device 402 and/or the device 404. The local database 423 also stores user preferences that include actions to be taken based on the user device 420 detecting one or more stored audio signals. The sound identification engine 425 is configured to compare a received audio signal to stored audio signals in the local database 423. The user interface 424 can be a graphical user interface such as a touchscreen, a keyboard, or the like that can be used to create user preferences that are stored in the local database 423.

In various embodiments, the audio samples received by the user device 420 can be stored in the local database 423 and/or the server database 412. Likewise, the identification of a non-human audio signal can be performed by the sound identification engine 425 of the user device 420 or by the sound identification engine 411 of the server 410. The server 410 can be implemented as a computer system such as the one shown in FIG. 3 or as a cloud based system such as the one shown in FIGS. 1 & 2. In embodiments where the server 410 is configured to perform sound identification and to store audio files, the user device 420 is configured to receive an audio signal and to transmit it to the server 410.

In exemplary embodiments, by analyzing type, pattern, duration, and loudness of sounds from one or more non-human sources, the voice response system can be configured to notify a user, or another designated party, if any proactive measure or activity needs to be performed to mitigate any possible risk or threat. For example, if the voice response system determines that the sound is a possible threat or risk to the user then the voice response system can suggest actions to be performed by the users. Likewise, if the voice response system determines that the sound indicates that an action needs to be performed by a connected device, either the source of the sound or another connected device, it can instruct the connected device to perform the action.

In exemplary embodiments, the voice response system is configured to use machine learning to correlate non-human audio signals with a desired response. For example, based on the voice response system observing an alarm from an oven timer going off and the user turning off the oven, the voice response system may automatically turn off the oven upon hearing the timer. In cases where ambient noise may prevent a user from hearing the oven alarm, this can prevent the oven from burning, or overcooking, the food inside the oven. In exemplary embodiments, the voice response system can be configured to instruct the connected device to start/stop an action or to change an operating condition, such as reducing a speed of a motor.

Figure 5:
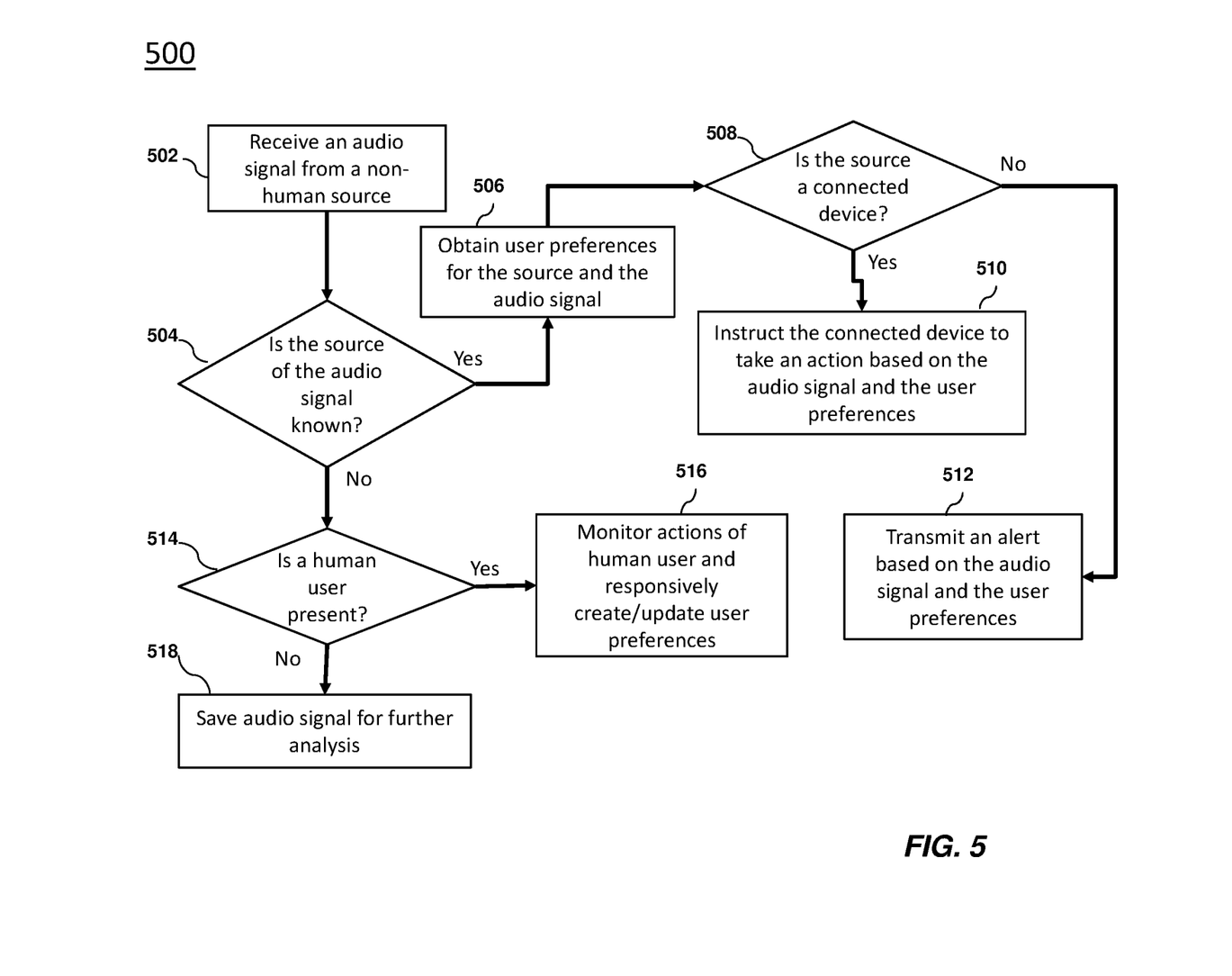
FIG. 5 depicts a flow diagram of a method for operating a voice response system based on non-human audio sources according to one or more embodiments of the present invention.

Turning now to FIG. 5, a flow diagram of a method 500 for operating a voice response system based on non-human audio sources in accordance with an embodiment is shown. The method 500 begins at block 502 and receives an audio signal from a non-human source. Next, as shown at decision block 504, the method 500 includes determining if the source of the audio signal is known. In exemplary embodiments, determining if the source of the audio signal is known includes comparing the audio signal to a plurality of audio signals. The plurality of audio signals can include both audio signals previously captured by the voice response system that are stored in a local database and audio signals stored in an online database. If the source of the audio signal is known, the method 500 proceeds to block 506 and obtains user preferences for the audio signal and the source of the audio signal. If the source of the audio signal is not known, the method 500 proceeds to decision block 514 and determines if a human user is present.

As shown at decision block 508, the method 500 includes determining if the source of the audio signal is a connected device. As used herein, a connected device refers to a device capable of being controlled by the voice response system. If the source of the audio signal is a connected device, the method 500 proceeds to block 510 and instructs the connected device to take an action based on the audio signal and the user preferences. If the source of the audio signal is not a connected device, the method 500 proceeds to block 512 and transmits an alert that is based on the audio signal and the user preferences. The alert can be an audio alert to a nearby user, a text message to a user of the device, and a phone call or email to another person, such as an emergency service provider.

If, as shown at block 514, a human user is determined to be present, the method 500 proceeds to block 516 and monitors the actions of the human user and responsively creates and/or updates the user preferences for the identified audio signal. Otherwise, the method 500 proceeds to block 518 and saves the audio signal for further analysis. The further analysis can include machine analysis performed by an online sound identification engine. For example, an internet search can be performed to identify the sound. The further analysis can also include playing back the captured sound to a user at a later time and asking the user to identify the sound.

In exemplary embodiments, the voice response system will continually capture sounds from its surrounding, if the captured sound does not have any linguistic pattern, then the voice response system will determine that the captured sound is a non-human sound. Along with sounds from non-human sources, the voice response system will also gather spoken words from humans present in the surrounding. The voice response system is configured to identify the activity of humans in the surrounding, the activity data can be identified as being related to a sound based on its temporal relationship to the sound. In exemplary embodiments, sensors installed in the connected devices or machines can be used to identify what activities were performed on the machines.

The voice response system can be configured to gather sound and activity data and to create a knowledge corpus about the properties of sounds generated from non-human sources, user actions, spoken commands, and user interaction with various nearby devices. The voice response systems can be used to gather data from various other participants and accordingly, collaborative knowledge corpus can be created. Using historical learning, the voice response system can correlate the sound from various non-human sources with the activity/actions of a user.

Figure 6:
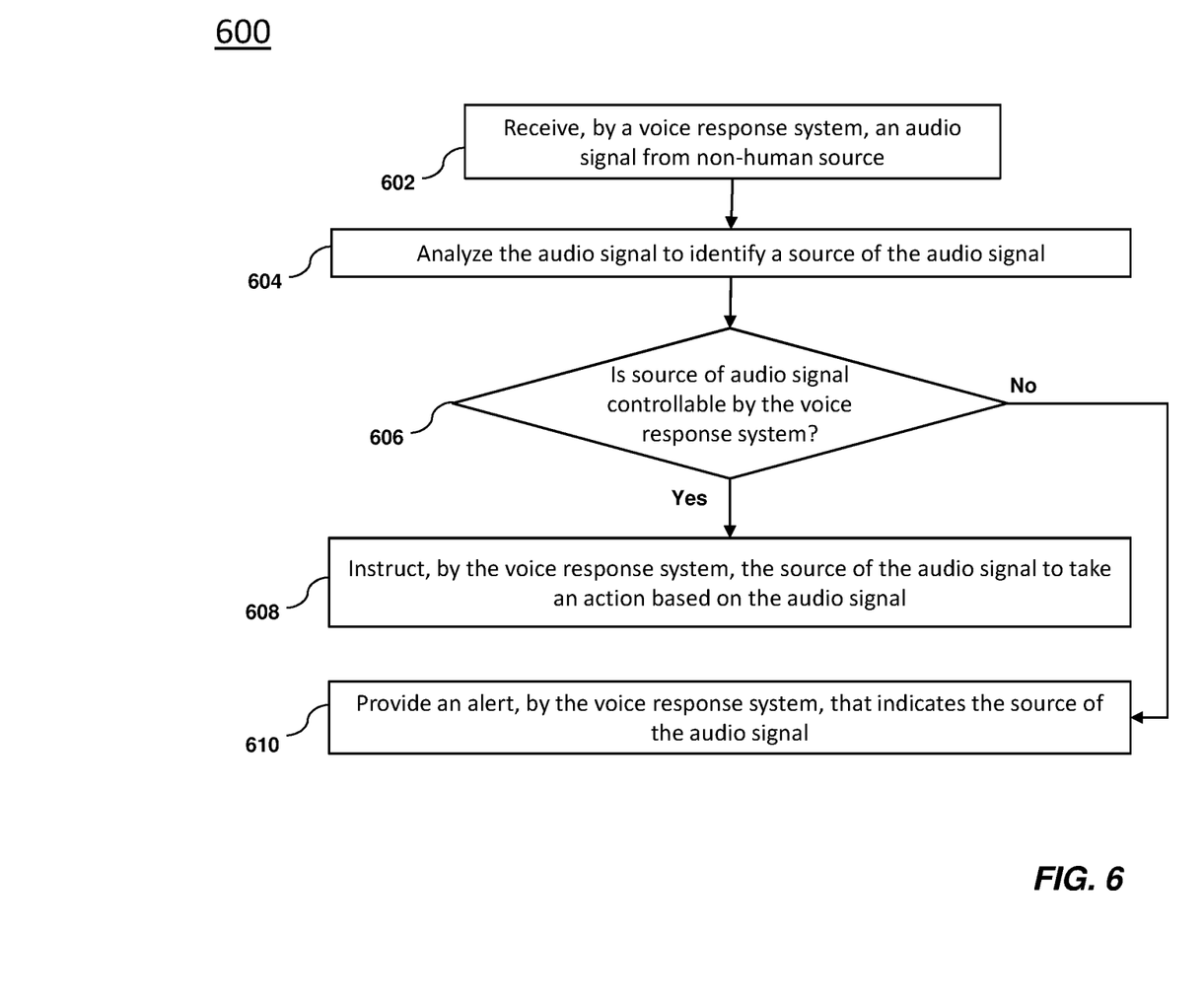
FIG. 6 depicts a flow diagram of another method for operating a voice response system based on non-human audio sources according to one or more embodiments of the present invention.

Turning now to FIG. 6, a flow diagram of a method 600 for operating a voice response system based on non-human audio sources in accordance with an embodiment is shown. As shown at block 602, the method 600 includes receiving, by the voice response system, an audio signal from the non-human source. In exemplary embodiments, the audio signal can be outside of a frequency range that is audible by a human, i.e., outside of the range from 20 Hz to 20 kHz. Next, as shown at block 604, the method 600 includes analyzing the audio signal to identify a source of the audio signal. The method 600 includes determining if the source of the audio signal is controllable by the voice response system, as shown at decision block 606. If the audio signal is controllable by the voice response system, the method 600 proceeds to block 608 and includes instructing, by the voice response system, the source of the audio signal to take an action based on the audio signal. In exemplary embodiments, the action is selected from stored user preferences and based on the audio signal and the source of the audio signal. The stored user preferences can be created using machine learning by observing a behavior of a user after receiving audio signals from un-identified sources.

If the audio signal is not controllable by the voice response system, the method 600 proceeds to block 610 and includes providing an alert, by the voice response system, that indicates the source of the audio signal. In one embodiment, providing the alert includes issuing a voice alert to a user by the voice response system. In another embodiment, providing the alert includes transmitting one of a text message, a phone call, and an email to a user of the voice response system. In a further embodiment, providing the alert includes transmitting one of a text message, a phone call, and an email to an emergency service determined based on a location of the voice response system and the audio signal.

Technical benefits include an improved functionality of voice response systems to identify and take actions based on a non-human audio signal in addition to spoken user commands. By increasing the range of inputs for the voice response systems to include a non-human audio signal in addition to spoken user commands, the utility of the voice response system is enhanced.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for operating a voice response system based on non-human audio sources, comprising:
    receiving, by the voice response system, an audio signal from non-human source;
    analyzing the audio signal to identify a source of the audio signal;
    based on a determination that the source of the audio signal is controllable by the voice response system, instructing, by the voice response system, the source of the audio signal to take an action based on the audio signal; and
    based on a determination that the source of the audio signal is not controllable by the voice response system, providing an alert, by the voice response system, that indicates the source of the audio signal,
    wherein the action is selected from stored user preferences and based on the audio signal and the source of the audio signal and wherein the stored user preferences are created using machine learning by observing a behavior of a user after receiving audio signals from un-identified sources.

2. The method of claim 1, wherein the audio signal is outside of a frequency range that is audible by a human.

3. The method of claim 1, wherein providing the alert comprises issuing a voice alert to a user by the voice response system.

4. The method of claim 1, wherein providing the alert comprises transmitting one of a text message, a phone call and an email to a user of the voice response system.

5. The method of claim 1, wherein providing the alert comprises transmitting one of a text message, a phone call and an email to an emergency service determined based on a location of the voice response system and the audio signal.

6. A system for operating a voice response system based on non-human audio sources, comprising:
    a memory having computer readable instructions; and
    a processor for executing the computer readable instructions, the computer readable instructions including instructions for:
    receiving, by the voice response system, an audio signal from non-human source;
    analyzing the audio signal to identify a source of the audio signal;

based on a determination that the source of the audio signal is controllable by the voice response system, instructing, by the voice response system, the source of the audio signal to take an action based on the audio signal; and based on a determination that the source of the audio signal is not controllable by the voice response system, providing an alert, by the voice response system, that indicates the source of the audio signal, wherein the action is selected from stored user preferences and based on the audio signal and the source of the audio signal and wherein the stored user preferences are created using machine learning by observing a behavior of a user after receiving audio signals from un-identified sources.

7. The system of claim 6, wherein the audio signal is outside of a frequency range that is audible by a human.

8. The system of claim 6, wherein providing the alert comprises issuing a voice alert to a user by the voice response system.

9. The system of claim 6, wherein providing the alert comprises transmitting one of a text message, a phone call and an email to a user of the voice response system.

10. The system of claim 6, wherein providing the alert comprises transmitting one of a text message, a phone call and an email to an emergency service determined based on a location of the voice response system and the audio signal.

11. A computer program product comprising a computer readable storage medium having program instructions embodied therewith the program instructions executable by a computer processor to cause the computer processor to perform a method, comprising:

receiving, by a voice response system, an audio signal from non-human source;

analyzing the audio signal to identify a source of the audio signal;

based on a determination that the source of the audio signal is controllable by the voice response system, instructing, by the voice response system, the source of the audio signal to take an action based on the audio signal; and based on a determination that the source of the audio signal is not controllable by the voice response system, providing an alert, by the voice response system, that indicates the source of the audio signal, wherein the action is selected from stored user preferences and based on the audio signal and the source of the audio signal and wherein the stored user preferences are created using machine learning by observing a behavior of a user after receiving audio signals from un-identified sources.

12. The computer program product of claim 11, wherein the audio signal is outside of a frequency range that is audible by a human.

13. The computer program product of claim 11, wherein providing the alert comprises issuing a voice alert to a user by the voice response system.

14. The computer program product of claim 11, wherein providing the alert comprises transmitting one of a text message, a phone call and an email to a user of the voice response system.

* * * * *